United States Patent [19]

Bobear

[11] 4,288,360

[45] Sep. 8, 1981

[54] FLAME RESISTANT SILICONE RUBBER COMPOSITIONS AND METHODS

[75] Inventor: William J. Bobear, Latham, N.Y.

[73] Assignee: General Electric Company, Waterford, N.Y.

[21] Appl. No.: 106,795

[22] Filed: Dec. 26, 1979

[51] Int. Cl.$^3$ .............................................. C08L 83/04
[52] U.S. Cl. ........................... 260/37 SB; 260/45.7 R; 260/45.75 R; 260/45.75 F
[58] Field of Search .................... 260/45.75 R, 37 SB, 260/45.7 R, 45.75 F

[56] References Cited

U.S. PATENT DOCUMENTS

| | | | |
|---|---|---|---|
| 3,514,424 | 5/1970 | Noble et al. | 260/37 |
| 3,635,874 | 1/1972 | Laur et al. | 528/15 |
| 3,652,488 | 3/1972 | Harder | 260/37 SB |
| 3,711,520 | 1/1973 | Pfeifer et al. | 260/37 SB |
| 3,734,877 | 5/1973 | Christie, Jr. | 260/37 SB |
| 3,836,489 | 9/1974 | Bargain | 260/18 S |

*Primary Examiner*—Melvyn I. Marquis
*Attorney, Agent, or Firm*—Michael J. Doyle; John L. Young; Philip L. Schlamp

[57] ABSTRACT

The present invention provides curable organopolysiloxane compositions having improved flame retardant properties, comprising, (1) an organopolysiloxane gum convertible to the cured, solid, elastic state and consisting essentially of silicon atoms, oxygen atoms and organic groups selected from the class consisting of methyl radicals, aromatic radicals selected from the class consisting of aryl and halogenated aryl radicals, vinyl radicals, lower alkyl radicals, lower cyanoalkyl radicals and lower haloalkyl radicals, (2) a finely divided inorganic filler, (3) a platinum compound or platinum and (4) and various effective amounts of hydrated alumina, fumed titanium dioxide, and magnesium oxide.

16 Claims, No Drawings

FLAME RESISTANT SILICONE RUBBER COMPOSITIONS AND METHODS

BACKGROUND OF THE INVENTION

This invention relates to organopolysiloxane compositions having improved flame retardant properties. More particularly, this invention is concerned with a composition of matter which, in the cured state, exhibits improved flame retardant properties and which comprises, (1) an organopolysiloxane gum convertible to the cured, solid, elastic state and consisting essentially of silicon atoms, oxygen atoms and organic groups selected from the class consisting of methyl radicals, aromatic radicals selected from the class consisting of aryl and halogenated aryl radicals, vinyl radicals, lower alkyl radicals, lower cyanoalkyl radicals and lower haloalkyl radicals, (2) a finely divided inorganic filler, (3) a platinum compound or platinum and (4) and various effective amounts of hydrated alumina, fumed titanium dioxide, and magnesium oxide, in combination.

A method for improving the flame retardancy of a silicone rubber is shown in U.S. Pat. No. 3,514,424, Nobel et al, where a platinum compound or platinum is combined with other components of a silicone rubber to impart flame retardancy. While the addition of platinum or platinum compound does improve the flame retardancy of silicone rubbers and is entirely adequate for most uses, the rubbers produced according to the Noble et al Patent are not as flame retardant as might be desired.

U.S. Pat. No. 3,734,877, Christie, discloses a flame retardant composition consisting essentially of a silicone elastomer and an appropriate filler in combination with effective amounts of triphenyl phosphite. It has been found that the addition of triphenyl phosphite is not required for the silicone compositions of the present invention.

Other flame resistant compositions are disclosed in U.S. Pat. No. 3,635,874—Laur, and U.S. Pat. No. 3,652,488—Harder. Both patents disclose a silicone elastomer stock as well as inorganic filler, platinum and carbon black. The Laur composition further contains 0.5 to 100 parts by weight of fume titanium dioxide.

The composition of the present invention is superior to those disclosed above in that it does not require the addition of such pigments as carbon black and fume titanium dioxide in order to provide outstanding flame retardant characteristics, especially when measured by the rigorous 60 second Burn test. Of course, the flame retardant properties of these pigments can be utilized if desired.

To the extent that the above-identified patents disclose compositions and methods of compounding silicone elastomers, especially those having flame resistant characteristics, they are hereby incorporated by reference.

The silicone compositions of the present invention are particularly useful for forming silicone rubber products, which meet or surpass Federal Aviation Regulations for flame retardancy when such silicone rubber products are utilized in aircraft. As is well-known, aircraft materials must meet rigorous flamability testing procedures before they can be incorporated into the aircraft. Various tests are utilized to demonstrate the compliance of aircraft materials with FAA regulations for flamability characteristics and often the air worthiness certification of an aircraft can depend in great part upon the ability of raw materials to meet these rigorous standards.

Accordingly, there has been developed what will be called a 60-Second Burn Test which demonstrates the superior flame retardant characteristics of the silicone rubber compositions of the present invention. Specimen dimensions are $3 \times 12 \times 0.075 \pm 0.005$ inches. A Bunsen or Tirrill gas burner having an inside diameter tube of approximately, 0.375 inches is utilized. The gas for the ignition source has an approximate composition of 55% hydrogen, 24% methane, 3% ethane and 18% carbon monoxide and has an approximate specific gravity of 0.365 (air = 1) and an approximate BTU content of 540 per cubic ft. at 21° C. Test specimens are conditioned prior to testing by exposure to an atmosphere of approximately 70° F. and a relative humidity of 50% for a minimum of 24 hours.

The 60-Second Burn Test takes place in a draft-free cabinet wherein the lighted gas burner is adjusted to a flame height of approximately 1.5 inches. The temperature of the gas flame is measured by a thermocouple at approximately 0.75 in. above the burner orifice. A temperature between 1500° and 2000° F. is preferred. The specimen to be tested is mounted vertically and its bottom edge is flush with the bottom edge of the holding clamp. A timer is started immediately when the burner is brought into position below the sample at a point approximately 0.75 in. above the end of the burner orifice. The flame is held directly beneath this point for $60 \pm 0.5$ seconds whereupon it is withdrawn. Timing is continued until the flame on the specimen goes out. The specimen should be considered "self-extinguished" if the flame goes out before reaching the top of the specimen. The term "self extinguishing time" will therefore be the recording time minus the 60-second ignition period.

It is therefore an object of the present invention to provide a curable silicone composition having superior flame resistant characteristics.

It is another object to provide a composition which surpasses the rigorous 60-Second Burn Test.

It is another object to provide a composition having flame resistant characteristics yet does not require the use of a carbon black pigment.

It is a further object to provide methods for producing such flame resistant curable silicone compositions.

SUMMARY OF THE INVENTION

The composition of the present invention is curable to a silicone rubber product which exhibits improved flame retardancy and tear strength and comprises; (A) 100 parts by weight of a base compound comprising a polydiorganosiloxane gum or blend of such gums having a viscosity of 1,000,000 to 200,000,000 centipoise at 25° C. and having an average unit formula of $R_aSiO_{4-a/2}$, wherein R is a monovalent substituted or unsubstituted hydrocarbon radical selected from the class consisting of methyl, vinyl and phenyl radicals, a is approximately 1.98 to 2.05, and wherein approximately 0 to 5.0 mole percent of the total organic groups are vinyl radicals; (B) 0.01 to 250 parts per million platinum; (C) 1.0 to 20 parts by weight hydrated alumina and (D) 0.001 to 2.0 parts by weight magnesium oxide. The composition of the present invention can also optionally include from 0.001 to 10 parts by weight of fumed titanium dioxide with good results.

The composition described above is curable to a silicone rubber when it is catalyzed and cured by means well-known in the art. For example, effective amounts of organic peroxides, as will be described below, are often utilized. The cured product of the present invention will then exhibit the improved flame retardancy and tear strength characteristics desired in a fabricated silicone rubber product. Various process aids for providing efficient milling and mixing of the ingredients and various fillers such as extending fillers and heat resistant fillers, as will be described below, may also be included.

The present invention also encompasses the process for providing a silicone composition which is curable to a silicone rubber exhibiting improved flame retardancy and tear strength wherein said process comprises the steps of compounding the various necessary and optional ingredients according to the process parameters which will be described below.

DESCRIPTION OF THE INVENTION

In producing the silicone rubber composition of the present invention there may be utilized any of the highly reinforcing type filler materials customarily employed in the production of elastomers. Preferably, these are inorganic compounds or combinations thereof. Especially preferable are the finely divided silica base fillers of the highly reinforcing type which are characterized by a particle diameter of less than 500 millimicrons and by surface areas of greater than 50 square meters per gram. Other inorganic filler materials may be employed alone or in combination with the preferred fillers with good results. Such filler materials are titanium dioxide, iron oxide, aluminum oxide as well as the inorganic filler materials known as inert fillers which may include, among others, diatomaceous earth, calcium carbonate, and quartz which will all may be employed in combination with the highly reinforcing silica fillers to improve the tensile strength or the hardness of the elastomeric product. Other examples of suitable fillers are diatomaceous silica, aluminum silicate, zinc oxide, zirconium silicate, barium sulfate, zinc sulfide, aluminum silicate and finely divided silica having surface-bonded alkoxy groups.

The present compositions ordinarily employ 10 to 100% by weight (based upon the polysiloxane gum) of the filler and preferably 20 to 60% by weight.

There is also employed in the present composition up to 25 percent and preferably 5 to 15 percent by weight (based on the polydiorganosiloxane gum) of a process aid for preventing the gum and the filler mixture from structuring prior to curing and after compounding. One example of such a process aid is a compound of the formula,

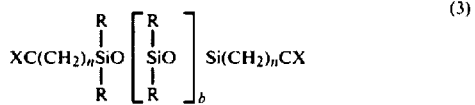

(3)

where R is a member selected from the class consisting of methyl, and phenyl, X is a member selected from the class consisting of —OH, —NH$_2$ or —OR', where R' is methyl or ethyl, n has a value of from 2 to 4, inclusive, and b is a whole number equal to from 0 to 10, inclusive. Further details as to the properties, as well as the method of preparation of the compound of formula (3), are to be found in the disclosure of Martellock U.S. Pat. No. 3,464,945, which is hereby incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes as is well-known in the art. One or more types of cyclic siloxanes so produced are mixed with the pre-determined amounts of a dihydrocarbon-substituted dialkoxysilane and the mixture is subjected to an equilibration treatment under controlled conditions to produce the desired alkoxy endblocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as thirty-five and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. No. 2,954,357, which is hereby incorporated into this specification by reference.

There may also be used as a process aid hydroxylated organosilanes which contain from one silicon-bonded hydroxyl group per 70 silicon atoms to two silicon-bonded hydroxyls per silicon atom and contains from 1.9 to 2.1 hydrocarbon radicals per silicon atom. The remaining valences o the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes.

The hydroxylated siloxanes may be prepared by any suitable method, such as heating said siloxanes with steam under pressure at temperatures of about 120° C. or hydrolyzing silanes of the formula R$_n$SiX$_{4-n}$ where X is any hydrolyzable group such as Cl, OR, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclicaryl hydrocarbon radicals. Further, detailed information as to the hydroxylated organosiloxanes which may be used as process aids is to be found in Konkle et al U.S. Pat. No. 2,890,188, the disclosure of which is incorporated into this application by reference.

Any of the above process aids may be used alone or mixtures thereof may be used in the above-defined concentrations. Further, other suitable process aids may also be used in the silicone rubber compositions of the present invention.

The curing of the silicone rubber composition of the present invention can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dialkyl peroxides which may have the structural formulas,

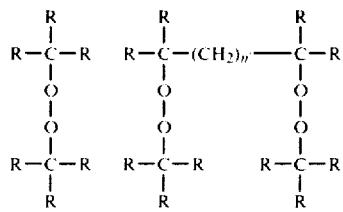

wherein R represents the same alkyl group throughout, or alkyl groups of two or more different types and n is two or a larger integer.

Among the specific peroxide curing catalysts that are preferred are di-tertiary-butyl peroxide, tertiarybutyltriethylmethyl peroxide, 2,2-bis(t-butylperoxy)diisopropyl benzene and di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroacyl peroxides such as 2,4-dichlorobenzoyl peroxide, monochlorobenzoyl peroxide, benzoyl peroxide, etc. Generally, 0.1–8 percent of said peroxide, by weight of the polydiorganosiloxane gum is used to cure the silicone rubber composition and preferably 0.5–3.0 percent by weight.

There also can incorporated into the present silicone rubber composition pigments and heat stabilizers, such as iron oxides, carbon black, rare earth octoates, urethanes, etc.

In the practice of the invention, the present polysiloxane composition is produced by mixing the organopolysiloxane polymer, the silica or other types of filler and the process aid. After this mixture is formed, the flame retardant ingredients and the peroxide catalyst are mixed into the composition. At this point there may be added an iron oxide or a pigment. The order of addition of the latter ingredients is not critical, it is only important that the organopolysiloxane gum, the filler and the process aid be mixed together first before the other ingredients are added. The other ingredients, such as the peroxide curing catalysts and the flame retardant may then be added in whatever order is desired. The various ingredients in the mixture can be blended together by use of standard rubber mixing equipment, such as doughmixer, rubber mill, Waring blender and the like. One procedure, for example, is to add the inorganic filler to the polymer gum while it is being milled, followed by the addition of the process aid and then adding the fiber, organic additive compound, peroxide curing catalyst and the other additional ingredients as desired. Another procedure that can be employed is to doughmix the polymer and the inorganic filler, the process aid and the peroxide curing catalyst while it is being milled on the rubber mill and then adding the other ingredients thereafter. The nature and amount of the particular ingredients utilized and the manner of blending would be known to those skilled in the art in order to produce the desired cured product. To form the organopolysiloxane, the polymer, inorganic filler and the process aid which is optional, are added in a doughmixer and after the mixture is complete, the mixture is put on a mill. While it is on the mill there is added to the mixture the peroxide curing catalyst and the flame retardant additive compounds in any desired order. The milled sheets are then cured in a manner well-known in the art. The organopolysiloxane composition can be converted to the cured product by heating at temperatures in the range of 80° C. to 650° C., depending upon the nature of the curing catalyst, duration of cure, the amount and type of filler, etc., as well as the amount of the other ingredients. The direct conversion of the polysiloxane composition to the cured product can be effected as a result of the conditions normally utilized during conventional molding, extrusion and calendering operations. For example, depending upon the curing catalyst used, the temperature from 80° to 300° C. can be employed for compression and transfer molding.

Hot air curing at the temperatures of from 100° C. to 640° C. or steam vulcanization at temperatures from 110° C. to 2.0° C. can be employed for periods from 5 to 10 minutes, or a matter of seconds. The sheets can be calendered or milled first and then press-cured at 200°–400° C. for 30 seconds to 10 minutes or passed into an oven where they can be air heated to a desired temperature range of 100° C. to 300° C.

The platinum-containing material may be any of the materials generally utilized in SiH + Si-olefin reactions. Among the forms of this platinum are elemental platinum as shown in U.S. Pat. No. 2,970,150—Bailey and platinum-on-charcoal, platinum-on-gamma-alumina, platinum-on-silica gel, platinum-on-asbestos, and chloroplatinic acid,

($H_2PtCl_6 \cdot 6H_2O$)

as mentioned in U.S. Pat. No. 2,823,218—Speier. Further, the platinum-containing material can be selected from those having the formula ($PtCl_2$.olefin)$_2$ and H($PtCl_3$.olefin), as described in U.S. Pat. No. 3,159,601—Ashby. The olefin shown in the previous two formulas can be almost any type of olefin, but is preferably an alkene having from 2 to 8 carbon atoms, a cycloalkene having from 5 to 7 carbon atoms or styrene. Specific olefins utilizable in the above formulas are ethylene, propylene, the various isomers of butylene, octylene, cyclopentene, cyclohexene, cycloheptene, etc. A further platinum-containing material usable in the composition of the present invention is the platinum chloride cyclopropane complex ($PtCl_2 \cdot C_3H_6$)$_2$ described in U.S. Pat. No. 3,159,662—Ashby.

Still further, the platinum-containing material can be a complex formed from chloroplatinic acid with up to 2 moles per gram of platinum of a member selected from the class consisting of alcohols, ethers, aldehydes and mixtures of the above-described in U.S. Pat. No. 3,220,972—Lamoreaux.

Another compound to be used as a flame retardant additive is that disclosed in French Pat. No. 1,548,775 of Karstedt. Generally speaking, this type of platinum complex is formed by reacting chloroplatinic acid containing 4 molecules of water of hydration with tetramethyl-tetravinylcyclotetrasiloxane in the presence of sodium bicarbonate in an ethanol solution.

A large number of other platinum compounds, including complexes which are conventionally and generally widely known in the field of SiH-olefin addition reactions, are also useful in the practice of the present invention.

Small but effective amounts of platinum compounds are sufficient to impart flame retardancy to the silicone rubber. However, superior flame resistant compositions can be produced when the platinum is combined with the other flame retardant additives, as disclosed in this patent application. In general, amounts of from less than 1 to more than 250 parts per million as platinum based on the organopolysiloxane gum can be used. Preferably, the amount is from less than 1 p.p.m. to about 25 p.p.m. of platinum based on the organopolysiloxane gum. (When the gum is a methyl and phenyl-containing gum, it is preferable that less than 1 p.p.m. of platinum be used in order to prevent damage due to heat aging of the final product.)

For a further example of the kinds of silicone rubber compositions which will display improved flame resistance when practiced in conjunction with the present invention, see U.S. Pat. No. 3,660,345—Bobear, which is hereby incorporated by reference.

The platinum or platinum compound can be employed in amounts greater than 250 parts per million but due to the cost of the materials, utilization of greater than 250 p.p.m. is not preferred as the increased amounts do not provide significant improvement in the flame retardancy of the final material.

The platinum complex utilized in the examples below is a combination of approximately 4 parts chloroplatinic acid in a solution of approximately 70 parts methylvinyl tetramer and 20 parts ethanol and approximately 4 to 6 parts sodium bicarbonate.

EXAMPLE 1

A base compound was prepared as follows: 35.3 parts of devolatilized dimethylvinyl chain-stopped dimethyl methylvinyl polysiloxane gum having 0.05 mole percent methylvinyl siloxane units having a viscosity of approximately 25,000,000 cp at 25° C. was compounded with 36.4 parts of devolatilized trimethyl chain-stopped dimethyl polysiloxane gum having a viscosity of approximately, 25,000,000 cp at 25° C., 13.9 parts devolatilized dimethylvinyl chain-stopped dimethyl diphenyl methylvinyl gum having 0.05 mole percent methylvinyl siloxane units and 5.3 mole percent diphenyl siloxane units along the chain and viscosity of approximately, 55,000,000 cp at 25° C. and 9.9 parts of a devolatilized trimethyl chain-stopped dimethyl diphenyl polysiloxane having 5.3 mole percent diphenyl siloxane units along the chain and a viscosity of approximately, 55,000,000 cp at 25° C. To this was added 4.5 parts of a trimethyl chain-stopped dimethyl methylvinyl polysiloxane oil having 13.5 mole percent methylvinyl siloxane units and a viscosity of approximately 1,000,000 cp at 25° C. Additional ingredients desired to be included in a silicone rubber composition were 5 parts of cyclic dimethyl polysiloxane tetramer, 0.05 parts ferric octoate, and such process aids as 2.0 parts of low molecular weight trimethoxy chain-stopped dimethyl polysiloxane oil and 4 parts of low molecular weight silanol chain-stopped dimethyl polysiloxane oil. Additionally, 2.0 parts of hexamethyldisilazane filler treatment was utilized as well as 38 parts fume silica filler (Cabosil HS-5), and 12 parts extending filler (5μ Minusil). Also included in the base compound of this example 6 parts fume titanium dioxide. After compounding, this base mixture was heated to 160° to 170° C. for 1.5 hours under an N₂ atmosphere having a flow of 50 cubic feet per hour.

EXAMPLE 2

Several samples of the flame retardant silicone rubber of the present invention were prepared by compounding 100 parts of the base compound on a rubber mill with varying amount of the flame retardant additives.

Sample A contained 100 parts of the base compound of Example 1, 0.3 parts of the platinum complex described above and 1.5 parts of a curing agent in the form of a 50% solution of bis 2,4-dichloro benzoyl peroxide in silicone oil (Cadox TX-50).

Sample B was the same as Sample A but, additionally, contained 10 parts hydrated alumina.

Sample C was the same as Sample B but, additionally, contained 0.4 parts magnesum oxide.

Each of the Samples A, B, and C were formed into ASTM slabs and press cured for 10 minutes with 40 lbs. steam, whereupon the samples were post baked for 2 hours at 400° F.

The cured silicone rubber samples showed the following properties:

TABLE I

|  | Sample A | B | C |
| --- | --- | --- | --- |
| Shore A | 56 | 57 | 59 |
| Tensile | 1255 | 1100 | 1065 |
| Elongation | 780 | 630 | 680 |
| Die B Tear | 224 | 185 | 198 |
| 60 Second Burn Test (Extinguishing, Time, Sec.) | 10 | 28 | 0 |

EXAMPLE 3

Another set of samples were prepared by starting with 100 parts of a base compound prepared by the method of Example 1. Table 2 demonstrates the effects of varying the amounts of hydrated alumina and magnesium oxide:

TABLE 2

|  | Sample D | E | F | G | H |
| --- | --- | --- | --- | --- | --- |
| Base Compound (parts) | 100 | 100 | 100 | 100 | 100 |
| Platinum Complex | 0.3 | 0.3 | 0.3 | 0.3 | 0.3 |
| Magnesium Oxide | 0.4 | 0.4 | 0.4 | 0.2 | 0.6 |
| Hydrated Alumina | 6 | 8 | 10 | 10 | 10 |
| Peroxide Catalyst | 1.5 | 1.5 | 1.5 | 1.5 | 1.5 |
| Shore A | 53 | 54 | 53 | 54 | 55 |
| Tensile (psi) | 1110 | 1054 | 1000 | 990 | 985 |
| Elongation (%) | 765 | 750 | 710 | 750 | 670 |
| Die B Tear (lbs./in.) | 190 | 175 | 180 | 175 | 170 |
| 60 Second Burn Test (Extinguishing Time, Sec.) | 21 | 5 | 0 | 0 | 0 |

EXAMPLE 4

Sample I was prepared in a manner analogous to Sample C above and therefore contained approximately 4 parts fume titanium dioxide per 100 parts of the base compound. Sample J was prepared in an analogous manner but without any fume titanium dioxide and the two samples compared as follows:

|  | Sample I | Sample J |
|---|---|---|
| Base Compound (parts) | 100 | 100 |
| Platinum Complex | 0.3 | 0.3 |
| Titanium Dioxide | 4.0 |  |
| Hydrated Alumina | 10 | 10 |
| Magnesium Oxide | 0.4 | 0.4 |
| Peroxide Catalyst | 1.75 | 1.75 |
| Shore A | 54 | 55 |
| Tensile (psi) | 1255 | 1280 |
| Elongation (%) | 670 | 600 |
| Die B Tear lbs/in. | 180 | 175 |
| 60 Second Burn Test (Extinguishing Time, Sec.) | 0 | 0 |

What is claimed as new and desired to be protected by Letters Patent of the United States is:

1. A composition curable to a silicone rubber exhibiting improved flame retardancy and tear strength comprising:
   (A) 100 parts by weight of a base compound comprising a polydiorganosiloxane gum or blend of polydiorganosiloxane gums having a viscosity of 1,000,000 to 200,000,000 centipoise at 25° C., and having an average unit formula of $R_aSiO_{(4-a)/2}$, wherein R is a monovalent substituted or unsubstituted hydrocarbon radical selected from the class consisting of methyl, vinyl and phenyl radicals, a is approximately 1.98 to 2.05, and wherein approximately 0 to 5.0 mole percent of the total organic groups are vinyl radicals; (B) 0.01 to 250 ppm platinum; (C) 1.0 to 20 parts by weight hydrated alumina, and (D) 0.001 to 2.0 parts by weight magnesium oxide.

2. The composition as in claim 1, further comprising E, 0.001 to 10 parts by weight fumed titanium dioxide.

3. The composition as in claim 1, further comprising an amount of organic peroxide effective for curing said composition to a silicone rubber.

4. The cured product of claims 1, 2 or 3.

5. The composition as in claim 1, further comprising a process aid.

6. The composition as in claim 1, further comprising an extending filler.

7. The composition as in claim 1, further comprising a heat resistant additive.

8. The composition as in claim 7, wherein said heat resistant additive is selected from rare earth octoate and ferric octoate.

9. A process for producing a composition curable to a silicone rubber exhibiting improved flame retardancy and tear strength comprising the steps of compounding (A) 100 parts by weight of a base compound comprising a polydiorganosiloxane gum or blend of polydiorganosiloxane gum having a viscosity of 1,000,000 to 200,000,000 centipoise at 25° C. and having an average unit formula of $R_aSiO_{(4-a)/2}$, wherein R is a monovalent substituted or unsubstituted hydrocarbon radical selected from the class consisting of methyl, vinyl and phenyl radicals, a is approximately 1.982 to 2.05 and wherein there is 0 to 5.0 percent vinyl radicals incorporated therein; (B) 0.01 to 250 ppm platinum; (C) 1.0 to 20 parts by weight hydrated alumina; and (D) 0.001 to 2.0 parts by weight mangesium oxide.

10. A composition as in claim 9, further comprising compounding (E) 0.001 to 10 parts by weight fumed titanium dioxide into said curable composition.

11. A process as in claim 9, further comprising adding a process aid.

12. The process as in claim 9, further comprising adding an extending filler.

13. The process as in claim 9, further comprising the step of adding a heat resistant additive.

14. The process as in claim 13, wherein said heat resistant additive is selected from ferric octoate and rear earth octoate.

15. A process as in claim 9, further comprising the step of adding an organic peroxide effective for curing said composition to a silicone rubber.

16. A process of claim 15, further comprising the step of curing said composition to a silicone rubber.

* * * * *